United States Patent
Goto et al.

(10) Patent No.: US 11,377,719 B2
(45) Date of Patent: Jul. 5, 2022

(54) HOT-ROLLED STEEL SHEET FOR HEAVY-WALL, HIGH-STRENGTH LINE PIPE, WELDED STEEL PIPE FOR HEAVY-WALL, HIGH-STRENGTH LINE PIPE, AND METHOD FOR PRODUCING THE WELDED STEEL PIPE

(71) Applicant: JFE Steel Corporation, Tokyo (JP)

(72) Inventors: Sota Goto, Tokyo (JP); Hiroshi Nakata, Tokyo (JP); Junji Shimamura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 741 days.

(21) Appl. No.: 16/309,202

(22) PCT Filed: Jun. 6, 2017

(86) PCT No.: PCT/JP2017/020981
§ 371 (c)(1),
(2) Date: Dec. 12, 2018

(87) PCT Pub. No.: WO2017/221690
PCT Pub. Date: Dec. 28, 2017

(65) Prior Publication Data
US 2019/0211430 A1  Jul. 11, 2019

(30) Foreign Application Priority Data
Jun. 22, 2016 (JP) .............................. JP2016-123564

(51) Int. Cl.
| | |
|---|---|
| *C22C 38/14* | (2006.01) |
| *C22C 38/02* | (2006.01) |
| *C22C 38/04* | (2006.01) |
| *C22C 38/06* | (2006.01) |
| *C21D 8/10* | (2006.01) |
| *C22C 38/26* | (2006.01) |
| *C22C 38/58* | (2006.01) |
| *C22C 38/12* | (2006.01) |
| *C21D 8/02* | (2006.01) |
| *C21D 9/08* | (2006.01) |
| *C21D 9/46* | (2006.01) |
| *C21D 6/00* | (2006.01) |
| *C22C 38/00* | (2006.01) |
| *C22C 38/24* | (2006.01) |
| *C22C 38/28* | (2006.01) |
| *C22C 38/32* | (2006.01) |
| *C22C 38/38* | (2006.01) |
| *C22C 38/42* | (2006.01) |

(Continued)

(52) U.S. Cl.
CPC .............. *C22C 38/58* (2013.01); *C21D 6/002* (2013.01); *C21D 6/004* (2013.01); *C21D 6/005* (2013.01); *C21D 6/008* (2013.01); *C21D 8/0226* (2013.01); *C21D 8/0263* (2013.01); *C21D 8/105* (2013.01); *C21D 9/08* (2013.01); *C21D 9/085* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/24* (2013.01); *C22C 38/26* (2013.01); *C22C 38/28* (2013.01); *C22C 38/32* (2013.01); *C22C 38/38* (2013.01); *C22C 38/42* (2013.01); *C22C 38/44* (2013.01); *C22C 38/48* (2013.01); *C22C 38/50* (2013.01); *C21D 2211/002* (2013.01); *C21D 2211/005* (2013.01); *C21D 2211/008* (2013.01); *C21D 2211/009* (2013.01); *F16L 1/123* (2013.01)

(58) Field of Classification Search
None
See application file for complete search history.

(56) References Cited

U.S. PATENT DOCUMENTS

| | | |
|---|---|---|
| 8,715,430 B2 | 5/2014 | Hara et al. |
| 9,062,356 B2 | 6/2015 | Yokoi et al. |

(Continued)

FOREIGN PATENT DOCUMENTS

| | | |
|---|---|---|
| CN | 102127707 A | 7/2011 |
| CN | 104694844 A | 6/2015 |

(Continued)

OTHER PUBLICATIONS

Korean Office Action for Korean Application No. 10-2018-7035879, dated Jun. 25, 2020, with Concise Statement of Relevance of Office Action, 7 pages.

(Continued)

*Primary Examiner* — Adam Krupicka
(74) *Attorney, Agent, or Firm* — RatnerPrestia

(57) ABSTRACT

A hot-rolled steel sheet for a heavy-wall, high-strength line pipe, the steel sheet having a chemical composition including, in mass %, C: 0.02 to 0.20%, Mn: 0.80 to 2.10%, Si: 0.01 to 0.50%, P: 0.034% or less, S: 0.0050% or less, Nb: 0.01 to 0.15%, Ti: 0.001 to 0.030%, and Al: 0.001 to 0.080%, the balance being Fe and incidental impurities, the steel sheet having a microstructure in which a main phase is a continuous cooling transformation structure and in which $\{001\}_\alpha$ grains in a plane whose normal direction is the sheet width direction constitute an area fraction of 10% or less and have a combined size of 10 μm or less, wherein the steel sheet has a tensile strength of 520 MPa or greater, and, in a drop weight tear test, a temperature at which a percent ductile fracture reaches 85% is −25° C. or lower.

20 Claims, No Drawings

(51) Int. Cl.
*C22C 38/44* (2006.01)
*C22C 38/48* (2006.01)
*C22C 38/50* (2006.01)
*F16L 1/12* (2006.01)

(56) References Cited

U.S. PATENT DOCUMENTS

| | | | |
|---|---|---|---|
| 9,062,363 | B2 | 6/2015 | Hara et al. |
| 9,657,364 | B2* | 5/2017 | Yokoi ............... C21D 8/0263 |
| 2004/0187982 | A1 | 9/2004 | Nakata et al. |
| 2010/0084054 | A1 | 4/2010 | Yokoi et al. |
| 2011/0079328 | A1 | 4/2011 | Yokoi et al. |
| 2016/0289788 | A1 | 10/2016 | Shibata et al. |

FOREIGN PATENT DOCUMENTS

| | | | |
|---|---|---|---|
| EP | 2116624 | A1 | 11/2009 |
| EP | 2133441 | A1 | 12/2009 |
| EP | 2295615 | A1 | 3/2011 |
| EP | 2441854 | A1 | 4/2012 |
| EP | 3020840 | A1 | 5/2016 |
| JP | 1136040 | A | 2/1999 |
| JP | 2004315957 | A | 11/2004 |
| JP | 2008248384 | A | 10/2008 |
| KR | 20160025624 | A | 3/2016 |
| WO | 2006106591 | A1 | 10/2006 |
| WO | 2008132882 | A1 | 11/2008 |
| WO | 2009145328 | A1 | 12/2009 |
| WO | 2013047702 | A1 | 4/2013 |
| WO | 2015079661 | A1 | 6/2015 |

OTHER PUBLICATIONS

International Search Report and Written Opinion for International Application No. PCT/JP2017/020981, dated Sep. 12, 2017—5 pages.
Canadian Office Action for Canadian Application No. 3,028,930, dated Feb. 25, 2020, 4 pages.
Extended European Search Report for European Application No. 17 815 159.3, dated Mar. 27, 2019, 8 pages.
Chinese Office Action with Search Report for Chinese Application No. 201780038335.4, dated May 29, 2020, 10 pages.

* cited by examiner

HOT-ROLLED STEEL SHEET FOR HEAVY-WALL, HIGH-STRENGTH LINE PIPE, WELDED STEEL PIPE FOR HEAVY-WALL, HIGH-STRENGTH LINE PIPE, AND METHOD FOR PRODUCING THE WELDED STEEL PIPE

CROSS REFERENCE TO RELATED APPLICATIONS

This is the U.S. National Phase application of PCT/JP2017/020981, filed Jun. 6, 2017, which claims priority to Japanese Patent Application No. 2016-123564, filed Jun. 22, 2016, the disclosures of each of these applications being incorporated herein by reference in their entireties for all purposes.

FIELD OF THE INVENTION

The present invention relates to a hot-rolled steel sheet for a heavy-wall, high-strength line pipe, a welded steel pipe for a heavy-wall, high-strength line pipe, and a method for producing the welded steel pipe. The hot-rolled steel sheet of the present invention includes a steel sheet and a steel strip (coil).

BACKGROUND OF THE INVENTION

In recent years, oil fields and gas fields have been actively developed in deep seas of more than 1500 feet (approximately 472 m) depth, and there is a need for a heavy-wall, high-strength line pipe that can withstand use in deep seas. Moreover, heavy-wall, high-strength line pipes that are used in deep seas are required to have excellent brittle fracture arrestability to minimize contamination that may be caused if brittle cracking should occur. Brittle fracture arrestability, when evaluated by a simple way, is evaluated by conducting a drop weight tear test (DWTT: Drop Weight Tear Test). A drop weight tear test is a test different from the Charpy test, which evaluates the initiation and propagation of ductile cracking.

To date, seamless pipes have been employed as line pipes that are used in deep seas. However, from the standpoint of reducing the cost of laying, there is an increasing need for a welded steel pipe formed from a hot-rolled steel sheet (hot-rolled coil, in particular), which can be produced at low cost compared with a seamless pipe.

Examples of technologies for improving the DWTT property of a steel plate or a hot-rolled steel sheet used for a line pipe include the following. Patent Literature 1 relates to a steel plate and discloses the following technology. A steel slab containing C: less than 0.03 mass %, Si: less than 0.6 mass %, Mn: 0.8 to 3.0 mass %, and Nb: 0.002 to 0.2 mass % is rolled in a temperature range of (the bainite transformation starting temperature (Bs temperature)+200° C.) to the bainite transformation starting temperature at an accumulated rolling reduction ratio of 50% or greater, thereby achieving a DWTT 85% ductility temperature of −45° C. or lower.

Patent Literature 2 relates to a steel plate and discloses the following. A steel slab containing, in mass %, C: 0.01 to 0.5%, Si: 0.01 to 3%, Mn: 0.1 to 5%, P: 0.03% or less, and S: 0.03% or less is reheated at a temperature between 1100 and 1150° C., and the rolling reduction ratio of each of the passes of the rolling in the recrystallization temperature range and the accumulated rolling reduction ratio in the non-recrystallization temperature range are appropriately controlled. This results in a maximum value of an accumulation degree of {100} in a cross-section rotated by 20 to 50° from a plate thickness cross-section about the axis of the rolling direction of 3 or less. Thus, a high-strength steel plate excellent in ductile fracture characteristics is obtained.

Patent Literature 3 relates to a hot-rolled steel plate and discloses the following. The steel plate contains, in mass %, C=0.01 to 0.1%, Si=0.05 to 0.5%, Mn=1 to 2%, P 0.03%, S≤0.005%, O≤0.003%, Al=0.005 to 0.05%, N=0.0015 to 0.006%, Nb=0.005 to 0.08%, and Ti=0.005 to 0.02%, where N−14/48×Ti>0%, Nb−93/14×(N−14/48×Ti)>0.005%, and contains Mo=0.01% or greater and less than 0.1%, Cr=0.01 to 0.3%, and Cu=0.01 to 0.3%, and the total rolling reduction ratio in the non-recrystallization temperature range is 65 to 80%. As a result, the elongation rate of a microstructure unit in a cross-section in the pipe circumferential direction after pipemaking is 2 or less. Thus, a high-strength hot-rolled steel plate superior in low temperature toughness is obtained.

Patent Literature 4 relates to a hot-rolled steel plate and discloses the following technology. Between rolling passes in the recrystallization temperature range, the steel plate is stopped for a predetermined time and, after hot rolling, is subjected to two-stage cooling. As a result, the plate thickness center portion has a steel structure in which the effective grain diameter is 2 to 10 μm, the total of the area ratios of bainite and acicular ferrite is 60 to 99%, and the absolute value of A−B is 0 to 30%, where the totals of the area ratio of bainite and the area ratio of acicular ferrite at any two portions are designated as A and as B. This makes it possible to obtain a hot coil for a line pipe having improved low-temperature toughness.

PATENT LITERATURE

PTL 1: Japanese Unexamined Patent Application Publication No. 11-36040
PTL 2: International Publication No. WO2006/106591
PTL 3: Japanese Unexamined Patent Application Publication No. 2008-248384
PTL 4: International Publication No. WO2013/047702

SUMMARY OF THE INVENTION

With the technology disclosed in Patent Literature 1 or Patent Literature 2, however, it is necessary to control the rolling temperature to a low temperature, namely the Bs temperature to the Bs temperature+200° C., or to control the rolling reduction ratio for each of the passes to be within 6 to 13%. Thus, the technologies are difficult to apply to a hot rolling line for a hot-rolled steel sheet (hot-rolled coil), which is subject to many restrictions in terms of equipment arrangement.

Neither the technology disclosed in Patent Literature 3 nor the technology disclosed in Patent Literature 4 sufficiently satisfies a necessary DWTT property. In particular, the technology disclosed in Patent Literature 3 achieves a ductile fracture surface of 72% to 100% at −20° C. for a hot-rolled steel plate of 17.2 mm plate thickness, but Patent Literature 3 has no disclosure of the DWTT property of a thick steel plate, for which achieving a sufficient DWTT property is particularly difficult, for example, a steel plate of greater than 20 mm thickness. With the technology of Patent Literature 4, holding for 100 seconds or more at a frequency of at least one or more times in the rough rolling step is necessary, and thus the production efficiency is low. In addition, no sufficient investigation was made into the rolling finishing temperature, and thus a good DWTT property is not necessarily obtained.

Aspects of the present invention solve the problems of the related art. An object is to provide a hot-rolled steel sheet for a heavy-wall, high-strength line pipe suitable as a line pipe for transportation of natural gas, crude oil, and the like, the steel sheet particularly having a high strength of API X60 to X80 grade (yield strength YS: 415 MPa or greater, tensile strength TS: 520 MPa or greater) and having an excellent base metal portion DWTT property (brittle fracture arrestability). A further object is to provide a welded steel pipe for a heavy-wall, high-strength line pipe formed from the hot-rolled steel sheet and a method for producing the welded steel pipe.

The DWTT property is a property determined by conducting a toughness evaluation test on the full thickness of the product sheet. In general, in the case of a hot-rolled steel sheet product having a large sheet thickness, it is difficult to achieve a DWTT property comparable to that of a hot-rolled steel sheet product having a small sheet thickness even when the hot-rolled steel sheets have the same chemical composition and are obtained by using the same production method.

The present inventors diligently conducted research on a microstructure for improving the DWTT property of a thick high-strength hot-rolled steel sheet (hot-rolled coil) of 20 mm or greater sheet thickness.

A brittle crack propagates in a fracture plane, which is a plane whose normal direction is the sheet width direction, in a longitudinal direction of a hot-rolled steel sheet. It was found that, by properly controlling the area fraction and the combined grain size of the cleavage planes {001} of BCC iron present in the fracture plane, the temperature at which the percent ductile fracture determined by DWTT reaches 85% can be −25° C. or lower. Furthermore, it was found that, even after a hot-rolled steel sheet having such characteristics was formed into a pipe shape, a temperature at which the percent ductile fracture by DWTT reaches 85% of −20° C. or lower can be satisfied.

Although the detailed mechanism is unknown at present, it was also found that the area fraction and the combined grain size of the {001} grains are affected by the retention time prior to finish rolling and by the rolling reduction ratio in finish rolling.

Aspects of the present invention have been accomplished based on the above findings and by conducting further research on, for example, a chemical composition necessary for ensuring strength. That is, aspects of the present invention are summarized as described below.

[1] A hot-rolled steel sheet for a heavy-wall, high-strength line pipe, the hot-rolled steel sheet having a chemical composition including, in mass %, C: 0.02 to 0.20%, Mn: 0.80 to 2.10%, Si: 0.01 to 0.50%, P: 0.034% or less, S: 0.0050% or less, Nb: 0.01 to 0.15%, Ti: 0.001 to 0.030%, and Al: 0.001 to 0.080%, the balance being Fe and incidental impurities, the hot-rolled steel sheet having a microstructure in which a main phase is a continuous cooling transformation structure (Zw) and in which $\{001\}_\alpha$ grains in a plane whose normal direction is the sheet width direction constitute an area fraction of 10% or less and have a combined size of 10 μm or less in terms of the area fraction average grain diameter, wherein the hot-rolled steel sheet has a tensile strength of 520 MPa or greater, and, in a drop weight tear test (DWTT), a temperature at which a percent ductile fracture reaches 85% is −25° C. or lower.

[2] The hot-rolled steel sheet for a heavy-wall, high-strength line pipe, according to [1], wherein the chemical composition further includes, in mass %, one or more selected from Cu: 0.5% or less, Ni: 0.5% or less, Cr: 0.5% or less, Mo: 0.5% or less, and V: 0.10% or less.

[3] The hot-rolled steel sheet for a heavy-wall, high-strength line pipe, according to [1] or [2], wherein the chemical composition further includes, in mass %, B: 0.0001 to 0.0020%.

[4] The hot-rolled steel sheet for a heavy-wall, high-strength line pipe, according to any one of [1] to [3], wherein the chemical composition further includes, in mass %, Ca: 0.0005 to 0.0050%.

[5] A method for producing a welded steel pipe for a heavy-wall, high-strength line pipe, the method including: forming the hot-rolled steel sheet for a heavy-wall, high-strength line pipe, according to any one of [1] to [4], into a pipe shape; and welding together abutted portions of the pipe shape.

[6] The method for producing a welded steel pipe for a heavy-wall, high-strength line pipe, according to [5], wherein the forming into the pipe shape is carried out by roll forming, and the welding of the abutted portions is carried out by high-frequency electric resistance welding.

[7] A welded steel pipe for a heavy-wall, high-strength line pipe, the welded steel pipe including a base metal portion and a weld zone, wherein the base metal portion includes a hot-rolled steel sheet for a heavy-wall, high-strength line pipe, the hot-rolled steel sheet having the chemical composition and the microstructure, according to any one of [1] to [4].

Aspects of the present invention provide, readily and at low cost, a hot-rolled steel sheet (hot-rolled coil) for a heavy-wall, high-strength line pipe, the steel sheet being of API X60 to X80 grade and having an excellent DWTT property (brittle fracture arrestability). In addition, the hot-rolled steel sheet obtained in accordance with aspects of the present invention can be formed into a steel pipe by forming the hot-rolled steel sheet into a tubular shape and welding together the abutted portions, and thereby a welded steel pipe for a heavy-wall, high-strength line pipe having an excellent DWTT property and being suitable as a replacement for a seamless pipe, which is expensive, is provided.

The hot-rolled steel sheet and the welded steel pipe according to aspects of the present invention are suitable for a line pipe for deep-water application.

DETAILED DESCRIPTION OF EMBODIMENTS OF THE INVENTION

Aspects of the present invention relate to a hot-rolled steel sheet for a heavy-wall, high-strength line pipe and a welded steel pipe for a heavy-wall, high-strength line pipe, the steel sheet and the steel pipe having a high strength of API X60 to X80 grade, having an excellent DWTT property (brittle fracture arrestability), and being suitable for a line pipe for transportation of natural gas, crude oil, and the like. In particular, aspects of the present invention relate to an electric resistance welded steel pipe suitable for use as a deep-sea line pipe of 12 inches to 18 inches outside diameter otherwise being typically formed of a seamless pipe. In accordance with aspects of the present invention, "heavy-wall" means that the sheet thickness (wall thickness of the base metal portion, in the case of the welded steel pipe) is 20 mm or greater. In addition, "hot-rolled steel sheet having an excellent DWTT property" means that, in Examples, which will be described later, the temperature at which the percent ductile fracture determined by DWTT reached 85% was −25° C. or lower.

First, reasons for the limitations on the chemical composition according to aspects of the present invention will be described. In the following description, "mass %" in the chemical composition is simply denoted as "%" unless otherwise specified.

C: 0.02 to 0.20%

C is an important element that contributes to increasing strength. To achieve a desired high strength, C needs to be contained in an amount of 0.02% or greater. It is preferable that the C content not be less than 0.03%. On the other hand, content of C in large amounts, greater than 0.20%, degrades the DWTT property and weldability. Accordingly, the C content is 0.20% or less. The C content is preferably not greater than 0.16% and more preferably not greater than 0.09%.

Mn: 0.80 to 2.10%

Mn is an element that contributes to increasing strength and improving toughness. To achieve a desired strength and toughness, Mn needs to be included in an amount of 0.80% or greater. It is preferable that the Mn content not be less than 0.95%. On the other hand, content of Mn in large amounts, greater than 2.10%, results in excessive formation of the martensite-austenite constituent and thus the increase in the hard phase degrades the DWTT property. Accordingly, the Mn content is not greater than 2.10%. The Mn content is preferably not greater than 1.85% and more preferably not greater than 1.65%.

Si: 0.01 to 0.50%

Si is an element that contributes to increasing strength through solid solution strengthening. To produce such an effect and achieve a desired high strength, Si needs to be included in an amount of 0.01% or greater. It is preferable that the Si content not be less than 0.05%. On the other hand, content of Si in large amounts, greater than 0.50%, results in excessive formation of the martensite-austenite constituent and thus degrades the DWTT property, as with Mn. For this reason, the Si is included in an amount of 0.50% or less. It is preferable that the Si content not be greater than 0.30%.

P: 0.034% or less

P is an element that is present as an impurity in steel and, moreover, tends to segregate at, for example, grain boundaries and thus adversely affects the properties of steel pipes, such as toughness. Accordingly, it is preferable that the P content be as low as possible. However, a P content of up to 0.034% is allowable. For these reasons, the P content is limited to 0.034% or less. It is preferable that the P content not be greater than 0.024%. It is preferable that the P content not be less than 0.001% because an excessive reduction in P results in an increase in the cost of refining.

S: 0.0050% or less

S is present as coarse sulfide-based inclusions, such as MnS, in steel and reduces ductility and toughness. Accordingly, it is desirable that the S content be as low as possible. However, a S content of up to 0.0050% is allowable. For these reasons, the S content is limited to 0.0050% or less. It is preferable that the S content not be greater than 0.0040%. It is preferable that the S content not be less than 0.0001% because an excessive reduction in S results in an increase in the cost of refining.

Nb: 0.01 to 0.15%

Nb is an element that forms carbides and nitrides and thus improves the strength of steel. To produce this effect, the Nb content is specified to be 0.01% or greater. It is preferable that the Nb content not be less than 0.02%. On the other hand, content of Nb in an amount of greater than 0.15% degrades the DWTT property, and thus the upper limit of the Nb content is 0.15%. The Nb content is preferably not greater than 0.12% and more preferably not greater than 0.08%.

Ti: 0.001 to 0.030%

Ti combines with N to form Ti nitride and immobilizes which adversely affects toughness. Thus, Ti serves to improve the DWTT property. To produce such an effect, content of Ti in an amount of 0.001% or greater is necessary. It is preferable that the Ti content not be less than 0.005%. On the other hand, content of Ti in an amount of greater than 0.030% significantly reduces toughness. Accordingly, the Ti content is 0.030% or less. The Ti content is preferably not greater than 0.025% and more preferably not greater than 0.020%.

Al: 0.001 to 0.080%

Al is an element that usefully serves as a deoxidizer for steel and needs to be included in an amount of 0.001% or greater to produce such an effect. It is preferable that the Al content not be less than 0.005%. On the other hand, content of Al in large amounts, greater than 0.080%, results in formation of Al oxide, which reduces the cleanliness of steel. Accordingly, the Al content is 0.080% or less. It is preferable that the Al content not be greater than 0.060%.

The other components are Fe and incidental impurities. It is preferable that, among the incidental impurities, N and O each be present in the ranges described below.

N: 0.006% or less

N is present as an incidental impurity in steel and reduces toughness by dissolving in steel or forming a nitride. For this reason, it is desirable that the N content be as low as possible. However, a N content of up to 0.006% is allowable.

O (oxygen): 0.008% or less

O is present as an incidental impurity in steel and reduces toughness by forming inclusions. For this reason, it is desirable that the 0 content be as low as possible. However, an O content of up to 0.008% is allowable.

The components described above form the basic chemical composition; however, in addition to the basic chemical composition, one or more selected from Cu: 0.5% or less, Ni: 0.5% or less, Cr: 0.5% or less, Mo: 0.5% or less, and V: 0.10% or less may be included.

One or more selected from Cu: 0.5% or less, Ni: 0.5% or less, Cr: 0.5% or less, Mo: 0.5% or less, and V: 0.10% or less Cu, Ni, Cr, Mo, and V are elements that contribute to increasing the strength of the steel sheet by improving hardenability and may be optionally included as necessary. Containing these elements prevents pearlite and polygonal ferrite from forming, particularly when the sheet thickness is large, namely 20 mm or greater, and thus is effective for achieving a desired strength and toughness. To produce such effects, it is preferable to include Cu: 0.05% or greater, Ni: 0.05% or greater, Cr: 0.05% or greater, Mo: 0.05% or greater, and/or V: 0.05% or greater. On the other hand, content of Cu: greater than 0.5%, Ni: greater than 0.5%, Cr: greater than 0.5%, Mo: greater than 0.5%, and/or V: greater than 0.10% results in saturation of the effects and also in increased material costs. For this reason, when one or more of these elements are included, it is preferable to limit the contents to Cu: 0.5% or less, Ni: 0.5% or less, Cr: 0.5% or less, Mo: 0.5% or less, and V: 0.10% or less. It is more preferable that the contents be Cu: 0.35% or less, Ni: 0.35% or less, Cr: 0.35% or less, Mo: 0.45% or less, and V: 0.08% or less.

Furthermore, it is possible to include B: 0.0001 to 0.0020% as necessary.

B: 0.0001 to 0.0020%

B is an element that significantly improves the hardenability of steel and thus contributes to increasing strength and may be optionally included as necessary. To produce the effect of improving strength, it is preferable that B be included in an amount of not less than 0.0001%. On the other hand, content of B in an amount of greater than 0.0020% causes the base metal to have a microstructure of lower bainite or martensite. As a result, the maximum value of the combined size of $\{001\}_\alpha$ grains in a plane whose normal direction is the sheet width direction may exceed 10 μm, and thus the DWTT property may be degraded. For this reason, it is preferable that B be limited to the range of 0.0001 to 0.0020%.

Furthermore, it is possible to include Ca: 0.0005 to 0.0050% as necessary.

Ca: 0.0005 to 0.0050%

Ca is an element that spheroidizes sulfide-based inclusions, such as MnS, and thus contributes to controlling the morphology of inclusions and may be optionally included as necessary. To produce such an effect, it is preferable that Ca be included in an amount of not less than 0.0005%. On the other hand, content of Ca in an amount of greater than 0.0050% may increase oxide-based inclusions, which may degrade the DWTT property. For this reason, in the case that Ca is included, it is preferable that the content be limited to the range of Ca: 0.0005 to 0.0050%.

Next, reasons for the limitations on the microstructure will be described.

Main phase: continuous cooling transformation structure (Zw)

The "continuous cooling transformation structure" is a general expression referring to quasi-polygonal ferrite, granular bainitic ferrite, and bainitic ferrite, which are found in "Atlas for Bainitic Microstructures Vol. 1", created by Basic Research Society of The Iron and Steel Institute of Japan, 1992). The continuous cooling transformation structure has an excellent balance between strength, and toughness. In accordance with aspects of the present invention, the continuous cooling transformation structure does not include polygonal ferrite, upper/lower bainite, or martensite.

In accordance with aspects of the present invention, the continuous cooling transformation structure constitutes the main phase. Specifically, the area fraction of the continuous cooling transformation structure, as determined by a method described in Examples, described later, is 90% or greater. As the second phase, pearlite, upper/lower bainite, martensite and the like may be present in an amount of less than 10% in total by area fraction. When the continuous cooling transformation structure is less than 90%, the second phase other than the main phase is 10% or greater, and as a result, the desired strength and DWTT property cannot be achieved.

In addition, to further improve the DWTT property, it is preferable that the average grain diameter of the continuous cooling transformation structure, which constitutes the main phase, be 30 μm or less in terms of the area fraction average grain diameter determined by a SEM/EBSD method, which will be described later. It is more preferable that the average grain diameter not be greater than 20 μm.

Area fraction of $\{001\}_\alpha$ grains in plane whose normal direction is sheet width direction is 10% or less and combined size of the $\{001\}_\alpha$ grains is 10 μm or less in terms of area fraction average grain diameter In accordance with aspects of the present invention, the area fraction of $\{001\}_\alpha$ grains in a plane whose normal direction is the sheet width direction is determined at ¼ locations from an end in the sheet width direction, which are at ¼ and ½ locations in the sheet thickness direction, as described in Examples, described later. In addition, in accordance with aspects of the present invention, the $\{001\}_\alpha$ grains are grains that are defined with a tolerance angle of 15° or less and whose <100> orientation is oriented toward a plane whose normal is in the sheet width direction; that is, the crack propagation plane.

The area fraction and the combined size of $\{001\}_\alpha$ grains in a plane whose normal direction is the sheet width direction are measured by a SEM/EBSD method. With regard to the area fraction of $\{001\}_\alpha$ grains, the fraction of grains whose <100> orientation is oriented toward a plane whose normal is in the sheet width direction, that is, the crack propagation plane is calculated by using a crystal direction mapping function of OIM Analysis, manufactured by TSL Solutions Co., Ltd, with a tolerance angle of 15° or less.

If the area fraction of $\{001\}_\alpha$ grains, which form cleavage planes of the continuous cooling transformation structure, is greater than 10%, the desired DWTT property cannot be satisfied. Accordingly, the area fraction of $\{001\}_\alpha$ grains in a plane whose normal direction is the sheet width direction is 10% or less. It is preferable that the area fraction not be greater than 8%. The closer the area fraction to 0%, the greater the effect of improving the DWTT property. Thus, no particular limitation is imposed on the lower limit.

The combined size of $\{001\}_\alpha$ grains in a plane whose normal direction is the sheet width direction is determined by generating a dataset regarding exclusively extracted $\{001\}_\alpha$ grains by using the crystal direction mapping function and the highlighting function of OIM Analysis, manufactured by TSL Solutions Co., Ltd, and calculating the area fraction average grain diameter. The combined size of $\{001\}_\alpha$ grains can be determined by setting the grain tolerance angle to 60° as the definition of a grain. If the combined size is greater than 10 μm in terms of the area fraction average grain diameter, the desired DWTT property cannot be satisfied even when the above-described area fraction of $\{001\}_\alpha$ grains is 10% or less. Accordingly, the combined size of $\{001\}_\alpha$ grains in a plane whose normal direction is the sheet width direction is 10 μm or less.

Tensile strength (TS): 520 MPa or greater

In accordance with aspects of the present invention, TS is specified to be 520 MPa or greater to ensure a high strength suitable for line pipes for transportation of natural gas, crude oil, and the like. It is preferable that TS not be less than 535 MPa. TS can be determined by a method described in Examples, described later.

Temperature at which percent ductile fracture reaches 85% in drop weight tear test (DWTT) is −25° C. or lower Aspects of the present invention are intended for use in heavy-wall, high-strength line pipe applications, and thus the temperature at which the percent ductile fracture reaches 85% in a DWTT in accordance with ASTM E436 is specified to be −25° C. or lower. It is preferable that the temperature not be higher than −30° C.

Next, the production method will be described.

It is preferable that the hot-rolled steel sheet (hot-rolled coil) be produced by subjecting a steel starting material having a chemical composition described above to the processes described below. It is preferable that the hot-rolled steel sheet according to aspects of the present invention be produced in a hot rolling line including a roughing mill, a finishing mill, and an accelerated cooling apparatus.

In accordance with aspects of the present invention, the method for producing the steel starting material need not be particularly limited, but it is preferable that molten steel having the above-mentioned composition be produced by using a common steelmaking method, such as by using a converter, and the steel be formed into a cast steel block, such as a slab (steel starting material), by using a common casting method, such as a continuous casting method. Of course, in place of a continuous casting method, an ingot making-slabbing method may be used to form a steel starting material (steel block).

The steel starting material having the above-mentioned chemical composition is heated in a heating furnace, thereafter subjected to rough rolling, finish rolling, and accelerated cooling, and coiled into a coil. Thus, a hot-rolled coil is formed. In the descriptions below, the temperature is a surface temperature of the steel starting material, the steel sheet, or the like unless otherwise specified.

The heating temperature for the steel starting material is 1100° C. to 1300° C. A low heating temperature can result in grain refinement and thus is preferable for the purpose of improving the toughness of the hot-rolled coil. However, if the heating temperature is less than 1100° C., the heating temperature is too low and thus dissolution of undissolved carbides may not proceed. As a result, a high strength of API X60 to X80 grade may not be achieved. On the other hand, if the heating temperature is a high temperature, namely higher than 1300° C., significant coarsening of austenite (γ) grains may occur, which may degrade the DWTT property. In addition, the amount of scale that forms may increase, which may degrade the surface properties. Furthermore, the energy loss increases, which causes an economic disadvantage. Accordingly, the heating temperature for the steel starting material is 1100° C. to 1300° C. It is preferable that the temperature be 1150 to 1230° C. It is preferable that the soaking and holding at the heating temperature last 30 minutes or more from the standpoint of homogenizing the heating temperature of the steel starting material.

In rough rolling in the hot rolling line, the temperature range for performing rough rolling is set to 900° C. or higher and 1230° C. or lower, which is the recrystallization temperature range, and rolling is performed at a rolling reduction ratio of 70% to 90%. If the rolling reduction ratio is less than 70%, the area fraction of $\{001\}_\alpha$ grains may exceed 10%. If the rolling reduction ratio in rough rolling is greater than 90%, the rolling reduction ratio in finish rolling, which is subsequently performed, may be insufficient. As a result, the combined size of $\{001\}_\alpha$ grains may exceed 10 μm. For this reason, the rolling reduction ratio in the recrystallization temperature range is 70 to 90%.

The temperature, the rolling reduction ratio, and the time between passes for each of the passes of rough rolling are not particularly limited, but it is preferable that, after completion of rough rolling, the process is held for 7 to 99 seconds until finish rolling is started. If, after completion of rough rolling, finish rolling is started after a holding time of less than 7 seconds, sufficient austenite recrystallization does not occur, and as a result, the desired area fraction and combined size of $\{001\}_\alpha$ grains cannot be achieved. On the other hand, if the holding time is more than 99 seconds, the effect is saturated, and thus the production efficiency degrades and the cost effectiveness is low.

The subsequent finish rolling is carried out in a temperature range of 750° C. to the rough rolling finish temperature. If the finishing mill delivery temperature is below 750° C., ferrite transformation begins during finish rolling and the accordingly formed coarse ferrite is worked, which may result in reduced strength and toughness. Accordingly, the finishing mill delivery temperature is 750° C. or higher. In the finish rolling, the rolling reduction ratio is adjusted to 44% or greater. If the rolling reduction ratio is less than 44%, nucleation sites for γ→α transformation are reduced, and as a result, refinement of the $\{001\}_\alpha$ grain-containing main phase may not be achieved. From the standpoint of the load on the finishing mill, it is preferable that the rolling reduction ratio in finish rolling not be greater than 95%.

In accordance with aspects of the present invention, after completion of the above-described hot rolling (specifically, completion of finish rolling), accelerated cooling of the steel sheet is started immediately, preferably within 5 seconds, to perform accelerated cooling in which the average cooling rate in a temperature range of 750 to 650° C. is 5 to 80° C./s, the temperature being a temperature at a mid-sheet thickness portion. That is, accelerated cooling is performed to an accelerated cooling stop temperature of 300° C. to 650° C., and, in the particular temperature range of 750 to 650° C. in the accelerated cooling, the average cooling rate is 5 to 80° C./s. Next, after completion of accelerated cooling, it is preferable that the steel sheet be coiled into a coil at 650° C. or lower. The accelerated cooling may be performed by a common method. After being coiled into a coil, the coil is allowed to be naturally cooled.

If the average cooling rate in the above-mentioned accelerated cooling is less than 5° C./s, the cooling rate is so slow that the structure that forms may not be a continuous cooling transformation structure, and it may become impossible to achieve a required strength and DWTT property. On the other hand, if the average cooling rate is greater than 80° C./s, a lower bainite or martensite phase may form, which may degrade the DWTT property. Accordingly, the average cooling rate in the temperature range of 750 to 650° C. is 5 to 80° C./s and preferably 10 to 60° C./s, the temperature being a temperature at a mid-sheet thickness portion.

If the above-mentioned accelerated cooling stop temperature is high, namely higher than 650° C., the precipitate particles, such as particles of Nb carbonitride, may coarsen, which may reduce strength. As a result, desired high strength may not be achieved. Furthermore, during gradual cooling after coiling, polygonal ferrite and pearlite may form, and as a result, the desired microstructure may not be obtained. Accordingly, the cooling stop temperature is 650° C. or lower. It is preferable that the accelerated cooling stop temperature not be less than 300° C. If the accelerated cooling stop temperature is below 300° C., the martensite phase may partially form even when the average cooling rate for accelerated cooling is adjusted to be within the above-mentioned range of 5 to 80° C./s, and as a result, the desired microstructure may not form. Thus, it is more preferable that the cooling stop temperature be 300 to 650° C. Since the steel sheet is coiled into a coil immediately after accelerated cooling is stopped, the coiling temperature is within the above mentioned temperature range.

The hot-rolled steel sheet obtained under the production conditions described above has a microstructure in which the main phase is a continuous cooling transformation structure (Zw) and in which $\{001\}_\alpha$ grains in a plane whose normal direction is the sheet width direction constitute an area fraction of 10% or less and have a combined size of 10 μm or less in terms of the area fraction average grain diameter. The hot-rolled steel sheet has a strength of API X60 to X80 grade and a DWTT property such that the temperature at which the percent ductile fracture reaches 85% is −25° C. or lower.

The hot-rolled steel sheet for a heavy-wall, high-strength line pipe obtained under the preferable production method described above is used as a blank material and formed into a pipe shape, and the abutted portions thereof are welded together to form a steel pipe. This provides a welded steel pipe for a heavy-wall, high-strength line pipe whose base metal portion has both a high strength of API X60 to X80 grade and a high toughness such that, in a DWTT, the temperature at which a ductile fracture of 85% is obtained is −20° C. or lower.

With regard to the pipe forming process, it is preferable to employ a common pipe forming process using an electric resistance welded steel pipe forming facility, in which the hot-rolled steel sheet described above is continuously cold-formed, by using a plurality of rolls, into an open pipe having a substantially circular cross section, and then the opposing end faces of the open pipe are heated to a temperature higher than or equal to the melting point thereof by high-frequency induction heating or high-frequency electrical resistance heating and are pressure-welded together by using a squeeze roll. Here, "high frequency" is 100 kHz or greater and less than 500 kHz. In accordance with aspects of the present invention, as will be appreciated, the pipe forming process is not limited to the above process.

Aspects of the present invention will be described more specifically below based on the examples.

Examples

Examples of the present invention will be described below. The scope of the present invention is not limited to the examples described below.

Steel starting materials each having a chemical composition shown in Table 1 (the contents are expressed in mass %) (the balance is Fe and incidental impurities) were heated to the holding temperature shown in Table 2, subjected to hot rolling (rough rolling and finish rolling) under the conditions shown in Table 2, subjected to accelerated cooling under the conditions shown in Table 2, coiled immediately after accelerated cooling, and allowed to be naturally cooled. Thus, hot-rolled steel sheets (hot-rolled coils) were produced.

The unit for the contents of the elements shown in Table 1 is mass %. The average cooling rate (° C./s) in accelerated cooling of coil No. 20 in Table 2 is an average cooling rate in the range of 750 to 680° C., the temperature being a temperature at a mid-sheet thickness portion. The rolling reduction ratio in Table 2 is defined as "(original thickness−final thickness)/original thickness×100%". The original thickness in finish rolling is the finish thickness in rough rolling.

The microstructure and the mechanical properties of the hot-rolled steel sheets were investigated by the following procedure.

(1) Microstructure

For each of the hot-rolled steel sheets, the main phase and the area fraction average grain diameter (μm) thereof, the second phase and the area fraction thereof, and the area fraction and the combined size (area fraction average grain diameter, in μm) of $\{001\}_\alpha$ grains in a plane whose normal direction is the sheet width direction were determined by using the SEM/EBSD method including the following conditions. The area fraction of the main phase was 100−area fraction of second phase. The area fraction average grain diameter of the main phase was determined by using OIM Analysis, as with the combined size of $\{001\}_\alpha$ grains. With regard to the phases of the microstructure, Zw denotes a continuous cooling transformation structure, PF denotes polygonal ferrite, P denotes pearlite, LB denotes lower bainite, and M denotes martensite.

Devices used and measurement conditions: an EBSD detector manufactured by EDAX Inc. mounted to a field emission scanning electron microscope manufactured by Hitachi High-Technologies Corporation was used.

Cutting of test pieces for observation and observation conditions: test pieces for observation were cut from a sheet thickness ¼ location and a sheet thickness ½ location. The measurement was performed under the following conditions. The surface to be observed was a L cross section along the length of each of the test pieces for observation, and the field of view for observation was 400×500 μm. Observations were made by using at least four fields of view or more, and the step size was 0.5 μm. The average value of the measurement results of each of the samples was adopted and listed in Table 3.

(2) Tensile Test Properties (Coil)

The tensile test was performed as follows. From the coil, a tensile test piece was cut in such a manner that the sheet width direction of the coil was the longitudinal direction of the test piece. In accordance with the specifications of ASTM A370, TS and YS were determined. A yield strength YS of 415 MPa or greater and a tensile strength TS of 520 MPa or greater were each regarded as good. The results are shown in Table 3.

(3) DWTT Property (Coil)

A test piece was cut out (with no thickness reduction) of the hot-rolled steel sheet in such a manner that the sheet width direction of the hot-rolled steel sheet was the longitudinal direction of the test piece, and a DWTT was conducted in accordance with the specifications of ASTM E436. A precrack was introduced as a press notch. The percent ductile fracture was calculated as the average of two runs performed. The DWTT 85% SATT was determined as the temperature at which the percent ductile fracture reached 85%. A DWTT 85% SATT of −25° C. or lower was regarded as good. The results are shown in Table 3.

—Test Using Steel Pipe—

The produced hot-rolled steel sheet (hot-rolled coil) was continuously cold-formed, by using a plurality of rolls, into an open pipe having a substantially circular cross section, and then the opposing end faces of the open pipe were heated to a temperature higher than or equal to the melting point thereof by high-frequency electrical resistance heating and were pressure-welded together by using a squeeze roll. Thus, a heavy-wall welded steel pipe was produced. In the "steel pipe shape" column of Table 3, the wall thickness and the outside diameter of the base metal portion of the welded steel pipe are shown.

(4) Tensile Test Properties (Steel Pipe)

The tensile test was performed as follows. From the base metal portion, a tensile test piece was cut in such a manner that the circumferential direction was the longitudinal direction of the test piece. In accordance with the specifications of ASTM A370, TS and YS were determined. A yield strength YS of 415 MPa or greater and a tensile strength TS of 520 MPa or greater were each regarded as good. The results are shown in Table 3.

(5) DWTT Property (Steel Pipe)

A test piece was cut (with no thickness reduction) from the base metal portion in such a manner that the circumferential direction was the longitudinal direction of the test piece, and a DWTT was conducted in accordance with the specifications of ASTM E436. A precrack was introduced as a press notch. The percent ductile fracture was calculated as the average of two runs performed. The DWTT 85% SATT was determined as the temperature at which the percent ductile fracture reached 85%. A DWTT 85% SATT of −20° C. or lower was regarded as good. The results are shown in Table 3.

TABLE 1

| | Steel No. | Essential elements | | | | | | | | Incidental impurities | |
|---|---|---|---|---|---|---|---|---|---|---|---|
| | | C | Mn | Si | P | S | Nb | Ti | Al | N | O |
| Invention example | A | 0.142 | 0.96 | 0.05 | 0.008 | 0.0013 | 0.025 | 0.015 | 0.035 | 0.0036 | 0.0020 |
| Invention example | B | 0.083 | 1.58 | 0.23 | 0.011 | 0.0022 | 0.044 | 0.008 | 0.032 | 0.0037 | 0.0023 |
| Invention example | C | 0.048 | 1.40 | 0.20 | 0.006 | 0.0032 | 0.110 | 0.020 | 0.036 | 0.0034 | 0.0022 |
| Invention example | D | 0.073 | 1.74 | 0.25 | 0.014 | 0.0022 | 0.060 | 0.003 | 0.031 | 0.0013 | 0.0022 |
| Invention example | E | 0.029 | 1.95 | 0.28 | 0.011 | 0.0020 | 0.078 | 0.018 | 0.030 | 0.0035 | 0.0020 |
| Comparative example | F | 0.038 | <u>2.50</u> | 0.43 | 0.012 | 0.0044 | 0.030 | 0.010 | 0.031 | 0.0035 | 0.0019 |
| Comparative example | G | 0.066 | 1.34 | 0.19 | 0.010 | 0.0036 | <u>—</u> | <u>—</u> | 0.031 | 0.0042 | 0.0019 |
| Comparative example | H | <u>0.011</u> | 1.20 | 0.17 | 0.010 | 0.0023 | 0.042 | 0.013 | 0.034 | 0.0033 | 0.0025 |
| Comparative example | I | <u>0.230</u> | 1.45 | 0.21 | 0.009 | 0.0020 | 0.055 | 0.012 | 0.032 | 0.0035 | 0.0022 |
| Comparative example | J | 0.055 | <u>0.76</u> | 0.11 | 0.015 | 0.0031 | 0.036 | 0.011 | 0.035 | 0.0034 | 0.0025 |
| Comparative example | K | 0.062 | 1.30 | <u>1.00</u> | 0.012 | 0.0030 | 0.040 | 0.014 | 0.036 | 0.0030 | 0.0024 |
| Comparative example | L | 0.048 | 1.22 | 0.17 | 0.013 | 0.0012 | <u>0.181</u> | 0.009 | 0.036 | 0.0036 | 0.0030 |
| Comparative example | M | 0.042 | 1.64 | 0.23 | 0.015 | 0.0043 | 0.045 | <u>0.045</u> | 0.038 | 0.0039 | 0.0028 |

| | Steel No. | Optional elements | | | | | | |
|---|---|---|---|---|---|---|---|---|
| | | Cu | Ni | Cr | Mo | V | B | Ca |
| Invention example | A | — | — | — | — | — | — | — |
| Invention example | B | — | — | — | — | — | — | 0.0024 |
| Invention example | C | — | — | 0.34 | — | — | — | — |
| Invention example | D | 0.20 | 0.20 | 0.11 | 0.23 | — | — | — |
| Invention example | E | — | — | 0.24 | — | 0.08 | 0.0002 | — |
| Comparative example | F | — | — | 0.15 | 0.10 | — | — | — |
| Comparative example | G | — | — | — | — | — | — | — |
| Comparative example | H | — | — | — | — | — | — | — |
| Comparative example | I | — | — | — | — | — | — | — |
| Comparative example | J | — | — | — | — | — | — | — |
| Comparative example | K | — | — | — | — | — | — | — |

TABLE 1-continued

| | | | | | | | | |
|---|---|---|---|---|---|---|---|---|
| Comparative example | L | — | — | — | — | — | — | — |
| Comparative examplele | M | — | — | — | — | — | — | — |

Unit for contents is mass %.

TABLE 2

| Note | Coil No. | Steel No. | Heating of slab Holding temperature ° C. | Time min. | Rough rolling Start temperature ° C. | Finish temperature ° C. | Start thickness mm | Finish thickness mm | Rolling reduction ratio % |
|---|---|---|---|---|---|---|---|---|---|
| Invention example | 1 | A | 1200 | 90 | 1181 | 925 | 230 | 65 | 72 |
| Invention example | 2 | A | 1200 | 50 | 1174 | 940 | 275 | 42 | 85 |
| Comparative example | 3 | A | <u>1095</u> | 50 | 1075 | 910 | 260 | 60 | 77 |
| Comparative example | 4 | A | 1180 | 70 | 1155 | 915 | 200 | 68 | <u>66</u> |
| Comparative example | 5 | A | 1180 | 65 | 1155 | 920 | 330 | 30 | <u>91</u> |
| Invention example | 6 | B | 1180 | 50 | 1152 | 920 | 230 | 56 | 76 |
| Invention example | 7 | B | 1180 | 80 | 1156 | 945 | 240 | 65 | 73 |
| Comparative example | 8 | B | 1180 | 115 | 1160 | 920 | 230 | 42 | 82 |
| Comparative example | 9 | B | 1180 | 80 | 1155 | 940 | 240 | 65 | 73 |
| Comparative example | 10 | B | 1180 | 80 | 1153 | 941 | 240 | 65 | 73 |
| Invention example | 11 | B | 1180 | 100 | 1155 | 930 | 230 | 44 | 81 |
| Invention example | 12 | C | 1230 | 50 | 1208 | 925 | 250 | 56 | 78 |
| Invention example | 13 | C | 1230 | 60 | 1202 | 940 | 260 | 63 | 76 |
| Comparative example | 14 | C | 1230 | 50 | 1206 | 905 | 260 | 54 | 79 |
| Invention example | 15 | D | 1250 | 120 | 1226 | 915 | 240 | 55 | 77 |
| Invention example | 16 | D | 1250 | 60 | 1225 | 900 | 240 | 44 | 82 |
| Comparative example | 17 | D | 1250 | 50 | 1228 | 910 | 240 | 47 | 80 |
| Invention example | 18 | E | 1200 | 100 | 1178 | 925 | 230 | 68 | 70 |
| Invention example | 19 | E | 1200 | 110 | 1179 | 920 | 250 | 56 | 78 |
| Comparative example | 20 | E | 1200 | 120 | 1178 | 930 | 230 | 45 | 80 |
| Comparative example | 21 | <u>F</u> | 1150 | 90 | 1122 | 900 | 260 | 46 | 82 |
| Comparative example | 22 | <u>G</u> | 1150 | 110 | 1124 | 950 | 250 | 65 | 74 |
| Comparative example | 23 | <u>H</u> | 1200 | 80 | 1185 | 930 | 235 | 65 | 72 |
| Comparative example | 24 | <u>I</u> | 1200 | 100 | 1173 | 935 | 230 | 65 | 72 |
| Comparative example | 25 | <u>J</u> | 1200 | 90 | 1180 | 940 | 235 | 65 | 72 |
| Comparative example | 26 | <u>K</u> | 1200 | 85 | 1183 | 920 | 230 | 65 | 72 |
| Comparative example | 27 | <u>L</u> | 1200 | 95 | 1177 | 930 | 230 | 65 | 72 |
| Comparative example | 28 | <u>M</u> | 1200 | 60 | 1176 | 930 | 240 | 65 | 73 |

| Note | Coil No. | Steel No. | Holding time sec. | Finish rolling Finish temperature ° C. | Product thickness mm | Rolling reduction ratio % | Accelerated cooling Average cooling rate ° C./s | Cooling stop ° C. |
|---|---|---|---|---|---|---|---|---|
| Invention example | 1 | A | 88 | 830 | 27 | 58 | 30 | 610 |
| Invention example | 2 | A | 70 | 790 | 23 | 45 | 55 | 585 |
| Comparative example | 3 | A | 30 | 790 | 27 | 55 | 25 | 567 |
| Comparative example | 4 | A | 35 | 780 | 23 | 66 | 30 | 540 |
| Comparative example | 5 | A | 30 | 780 | 21 | <u>30</u> | 25 | 550 |
| Invention example | 6 | B | 70 | 805 | 22 | 61 | 50 | 505 |
| Invention example | 7 | B | 50 | 829 | 28 | 57 | 33 | 465 |
| Comparative example | 8 | B | 35 | 820 | 31 | <u>26</u> | 16 | 470 |
| Comparative example | 9 | B | 60 | 829 | 22 | 66 | <u>85</u> | 520 |
| Comparative example | 10 | B | 65 | <u>730</u> | 22 | 66 | 25 | 500 |
| Invention example | 11 | B | 35 | 785 | 20 | 55 | 22 | 518 |
| Invention example | 12 | C | 30 | 797 | 22 | 61 | 24 | 452 |
| Invention example | 13 | C | 15 | 778 | 25 | 60 | 28 | 450 |
| Comparative example | 14 | C | <u>5</u> | 811 | 23 | 57 | 9 | 535 |
| Invention example | 15 | D | 60 | 815 | 31 | 44 | 28 | 510 |
| Invention example | 16 | D | 60 | 821 | 20 | 55 | 18 | 540 |
| Comparative example | 17 | D | 15 | 804 | 28 | <u>40</u> | <u>2</u> | 540 |
| Invention example | 18 | E | 15 | 801 | 25 | 63 | 18 | 528 |
| Invention example | 19 | E | 98 | 787 | 25 | 55 | 5 | 532 |
| Comparative example | 20 | E | 70 | 799 | 22 | 51 | 20 | <u>680</u> |
| Comparative example | 21 | <u>F</u> | 30 | 814 | 30 | <u>35</u> | 24 | 572 |
| Comparative example | 22 | <u>G</u> | 60 | 826 | 25 | 62 | 30 | 535 |
| Comparative example | 23 | <u>H</u> | 88 | 828 | 27 | 58 | 25 | 550 |

TABLE 2-continued

| Note | Coil No. | Steel | | | | | | |
|---|---|---|---|---|---|---|---|---|
| Comparative example | 24 | I | 86 | 830 | 25 | 62 | 35 | 560 |
| Comparative example | 25 | J | 82 | 825 | 23 | 65 | 35 | 540 |
| Comparative example | 26 | K | 76 | 831 | 22 | 66 | 30 | 540 |
| Comparative example | 27 | L | 78 | 830 | 27 | 58 | 30 | 590 |
| Comparative example | 28 | M | 55 | 835 | 23 | 65 | 30 | 575 |

TABLE 3

| | | | Microstructure | | | | | Mechanical properties (coil) |
|---|---|---|---|---|---|---|---|---|
| Note | Coil No. | Steel No. | Main phase structure* | Average grain diameter μm | Second phase type* | Second phase area fraction % | {001} area fraction % | {001} combined size μm | YS MPa |
| Invention example | 1 | A | Zw | 14 | P | 1.3 | 5.3 | 7.3 | 498 |
| Invention example | 2 | A | Zw | 16 | P | 3.8 | 7.2 | 9.2 | 488 |
| Comparative example | 3 | A | Zw | 16 | P | 1.1 | 5.3 | 4.4 | 388 |
| Comparative example | 4 | A | Zw | 21 | P | 1.2 | 11 | 7.6 | 499 |
| Comparative example | 5 | A | Zw | 18 | P | 1.0 | 6.3 | 20 | 501 |
| Invention example | 6 | B | Zw | 17 | LB | 2.2 | 5.6 | 6.2 | 518 |
| Invention example | 7 | B | Zw | 15 | LB | 0.7 | 7.0 | 7.0 | 540 |
| Comparative example | 8 | B | Zw | 20 | LB | 2.0 | 5.6 | 16 | 544 |
| Comparative example | 9 | B | M | 42 | LB | 1.8 | 15 | 25 | 738 |
| Comparative example | 10 | B | Zw | 20 | PF | 13.0 | 4.8 | 5.1 | 435 |
| Invention example | 11 | B | Zw | 17 | LB | 2.8 | 6.8 | 4.5 | 512 |
| Invention example | 12 | C | Zw | 9 | LB | 2.6 | 6.4 | 4.1 | 571 |
| Invention example | 13 | C | Zw | 11 | LB | 2.3 | 4.3 | 7.7 | 577 |
| Comparative example | 14 | C | Zw | 16 | LB | 1.8 | 12 | 8.0 | 551 |
| Invention example | 15 | D | Zw | 10 | M | 2.4 | 4.9 | 7.4 | 615 |
| Invention example | 16 | D | Zw | 12 | M | 0.8 | 7.5 | 5.2 | 593 |
| Comparative example | 17 | D | PF | 25 | P | 11 | 6.0 | 7.1 | 565 |
| Invention example | 18 | E | Zw | 9 | M | 2.9 | 7.3 | 8.1 | 680 |
| Invention example | 19 | E | Zw | 10 | M | 2.7 | 6.7 | 8.5 | 691 |
| Comparative example | 20 | E | PF | 22 | P | 4 | 5.1 | 4.2 | 672 |
| Comparative example | 21 | F | Zw | 15 | M | 14 | 5.3 | 6.5 | 841 |
| Comparative example | 22 | G | Zw | 14 | P | 0.5 | 5.2 | 2.0 | 407 |
| Comparative example | 23 | H | Zw | 18 | P | 0.5 | 5.1 | 2.3 | 405 |
| Comparative example | 24 | I | Zw | 12 | M | 12 | 5.5 | 8.8 | 699 |
| Comparative example | 25 | J | Zw | 10 | P | 1.0 | 6.2 | 7.0 | 411 |
| Comparative example | 26 | K | Zw | 13 | M | 11 | 5.0 | 6.8 | 465 |
| Comparative example | 27 | L | Zw | 16 | P | 0.8 | 4.8 | 8.4 | 622 |
| Comparative example | 28 | M | Zw | 17 | P | 1.1 | 6.0 | 8.0 | 535 |

| | | | Mechanical properties (coil) | | Steel pipe shape | | Mechanical properties (steel pipe) | | |
|---|---|---|---|---|---|---|---|---|---|
| Note | Coil No. | Steel No. | TS MPa | DWTT85% SATT °C. | Wall thickness mm | Outside diameter inch | YS MPa | TS MPa | DWTT85% SATT °C. |
| Invention example | 1 | A | 566 | −30 | 27 | 20 | 458 | 559 | −20 |
| Invention example | 2 | A | 555 | −30 | 23 | 18 | 445 | 543 | −20 |
| Comparative example | 3 | A | 460 | −70 | 27 | 20 | 382 | 464 | −55 |
| Comparative example | 4 | A | 562 | −5 | 23 | 16 | 480 | 580 | 0 |
| Comparative example | 5 | A | 570 | −5 | 21 | 18 | 495 | 575 | −5 |
| Invention example | 6 | B | 589 | −50 | 22 | 16 | 476 | 595 | −40 |
| Invention example | 7 | B | 607 | −60 | 28 | 22 | 494 | 602 | −50 |
| Comparative example | 8 | B | 604 | −15 | 31 | 22 | 480 | 593 | −5 |
| Comparative example | 9 | B | 820 | 10 | 22 | 18 | 740 | 830 | 15 |
| Comparative example | 10 | B | 500 | −30 | 22 | 22 | 453 | 510 | −25 |
| Invention example | 11 | B | 588 | −60 | 20 | 16 | 468 | 585 | −45 |
| Invention example | 12 | C | 645 | −35 | 22 | 16 | 535 | 653 | −25 |
| Invention example | 13 | C | 652 | −40 | 25 | 18 | 530 | 654 | −30 |
| Comparative example | 14 | C | 622 | −5 | 23 | 18 | 539 | 665 | 0 |
| Invention example | 15 | D | 694 | −50 | 31 | 24 | 582 | 701 | −35 |
| Invention example | 16 | D | 670 | −50 | 20 | 14 | 569 | 685 | −35 |
| Comparative example | 17 | D | 638 | −15 | 28 | 20 | 510 | 622 | 0 |
| Invention example | 18 | E | 768 | −60 | 25 | 18 | 645 | 787 | −50 |
| Invention example | 19 | E | 780 | −50 | 25 | 18 | 649 | 792 | −40 |
| Comparative example | 20 | E | 759 | −10 | 22 | 16 | 608 | 742 | −5 |
| Comparative example | 21 | F | 950 | −10 | 30 | 22 | 772 | 942 | 0 |
| Comparative example | 22 | G | 460 | −15 | 25 | 18 | 394 | 475 | −10 |
| Comparative example | 23 | H | 476 | −60 | 27 | 16 | 410 | 480 | −45 |
| Comparative example | 24 | I | 768 | 15 | 25 | 18 | 613 | 765 | 20 |
| Comparative example | 25 | J | 473 | −30 | 23 | 18 | 410 | 489 | −25 |
| Comparative example | 26 | K | 620 | 0 | 22 | 24 | 494 | 625 | 15 |

TABLE 3-continued

| | | | | | | | | | |
|---|---|---|---|---|---|---|---|---|---|
| Comparative example | 27 | L | 707 | 0 | 27 | 14 | 575 | 710 | 10 |
| Comparative example | 28 | M | 620 | 5 | 23 | 20 | 514 | 630 | 10 |

*PF Polygonal ferrite
M Martensite
LB Lower bainite
P Pearlite
Zw Continuous cooling transformation structure The hot-rolled steel sheets and welded steel pipes of Invention Examples all had a large thickness, namely a thickness of 20 mm or greater, had excellent mechanical properties, and were thus suitable for use as a heavy-wall, high-strength line pipe. In contrast, Comparative Examples did not satisfy TS, YS, and the DWTT property at high levels.

The invention claimed is:

1. A hot-rolled steel sheet for a heavy-wall, high-strength line pipe,
the hot-rolled steel sheet having a chemical composition comprising, in mass %,
C: 0.02 to 0.20%,
Mn: 0.80 to 2.10%,
Si: 0.01 to 0.50%,
P: 0.034% or less,
S: 0.0050% or less,
Nb: 0.01 to 0.15%,
Ti: 0.001 to 0.030%, and
Al: 0.001 to 0.080%, the balance being Fe and incidental impurities,
the hot-rolled steel sheet having a microstructure in which a main phase is a continuous cooling transformation structure and in which $\{001\}_\alpha$ grains in a plane whose normal direction is a sheet width direction constitute an area fraction of 10% or less and have a combined size of 10 μm or less in terms of an area fraction average grain diameter, wherein
the hot-rolled steel sheet has a tensile strength of 520 MPa or greater, and, in a drop weight tear test (DWTT), a temperature at which a percent ductile fracture reaches 85% is −25° C. or lower.

2. The hot-rolled steel sheet for a heavy-wall, high-strength line pipe, according to claim 1, wherein the chemical composition further comprises, in mass %, one or more selected from
Cu: 0.5% or less,
Ni: 0.5% or less,
Cr: 0.5% or less,
Mo: 0.5% or less, and
V: 0.10% or less.

3. The hot-rolled steel sheet for a heavy-wall, high-strength line pipe, according to claim 1, wherein the chemical composition further comprises, in mass %, B: 0.0001 to 0.0020%.

4. The hot-rolled steel sheet for a heavy-wall, high-strength line pipe, according to claim 1, wherein the chemical composition further comprises, in mass %, Ca: 0.0005 to 0.0050%.

5. A method for producing a welded steel pipe for a heavy-wall, high-strength line pipe, the method comprising: forming the hot-rolled steel sheet for a heavy-wall, high-strength line pipe, according to claim 1, into a pipe shape; and welding together abutted portions thereof.

6. The method for producing a welded steel pipe for a heavy-wall, high-strength line pipe, according to claim 5, wherein the forming into the pipe shape is carried out by roll forming, and the welding of the abutted portions is carried out by high-frequency electric resistance welding.

7. A welded steel pipe for a heavy-wall, high-strength line pipe, the welded steel pipe comprising a base metal portion and a weld zone, wherein the base metal portion comprises a hot-rolled steel sheet for a heavy-wall, high-strength line pipe, the hot-rolled steel sheet having the chemical composition and the microstructure, according to claim 1.

8. The hot-rolled steel sheet for a heavy-wall, high-strength line pipe, according to claim 2, wherein the chemical composition further comprises, in mass %, B: 0.0001 to 0.0020%.

9. The hot-rolled steel sheet for a heavy-wall, high-strength line pipe, according to claim 2, wherein the chemical composition further comprises, in mass %, Ca: 0.0005 to 0.0050%.

10. The hot-rolled steel sheet for a heavy-wall, high-strength line pipe, according to claim 3, wherein the chemical composition further comprises, in mass %, Ca: 0.0005 to 0.0050%.

11. The hot-rolled steel sheet for a heavy-wall, high-strength line pipe, according to claim 8, wherein the chemical composition further comprises, in mass %, Ca: 0.0005 to 0.0050%.

12. A method for producing a welded steel pipe for a heavy-wall, high-strength line pipe, the method comprising: forming the hot-rolled steel sheet for a heavy-wall, high-strength line pipe, according to claim 2, into a pipe shape; and welding together abutted portions thereof.

13. A method for producing a welded steel pipe for a heavy-wall, high-strength line pipe, the method comprising: forming the hot-rolled steel sheet for a heavy-wall, high-strength line pipe, according to claim 3, into a pipe shape; and welding together abutted portions thereof.

14. A method for producing a welded steel pipe for a heavy-wall, high-strength line pipe, the method comprising: forming the hot-rolled steel sheet for a heavy-wall, high-strength line pipe, according to claim 4, into a pipe shape; and welding together abutted portions thereof.

15. The method for producing a welded steel pipe for a heavy-wall, high-strength line pipe, according to claim 12, wherein the forming into the pipe shape is carried out by roll forming, and the welding of the abutted portions is carried out by high-frequency electric resistance welding.

16. The method for producing a welded steel pipe for a heavy-wall, high-strength line pipe, according to claim 13, wherein the forming into the pipe shape is carried out by roll forming, and the welding of the abutted portions is carried out by high-frequency electric resistance welding.

17. The method for producing a welded steel pipe for a heavy-wall, high-strength line pipe, according to claim 14, wherein the forming into the pipe shape is carried out by roll forming, and the welding of the abutted portions is carried out by high-frequency electric resistance welding.

18. A welded steel pipe for a heavy-wall, high-strength line pipe, the welded steel pipe comprising a base metal portion and a weld zone, wherein the base metal portion comprises a hot-rolled steel sheet for a heavy-wall, high-strength line pipe, the hot-rolled steel sheet having the chemical composition and the microstructure, according to claim 2.

19. A welded steel pipe for a heavy-wall, high-strength line pipe, the welded steel pipe comprising a base metal portion and a weld zone, wherein the base metal portion comprises a hot-rolled steel sheet for a heavy-wall, high-strength line pipe, the hot-rolled steel sheet having the chemical composition and the microstructure, according to claim 3.

20. A welded steel pipe for a heavy-wall, high-strength line pipe, the welded steel pipe comprising a base metal portion and a weld zone, wherein the base metal portion comprises a hot-rolled steel sheet for a heavy-wall, high-strength line pipe, the hot-rolled steel sheet having the chemical composition and the microstructure, according to claim 4.

* * * * *